United States Patent
Chen et al.

(10) Patent No.: US 11,513,964 B2
(45) Date of Patent: Nov. 29, 2022

(54) DATA-RELATIONSHIP-BASED FAST CACHE SYSTEM

(71) Applicant: Dell Products L.P., Round Rock, TX (US)

(72) Inventors: Chi Chen, Chengdu (CN); Ruiyang Zhang, Chengdu (CN); Weilan Pu, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/235,657

(22) Filed: Apr. 20, 2021

(65) Prior Publication Data

US 2022/0292022 A1  Sep. 15, 2022

(30) Foreign Application Priority Data

Mar. 12, 2021  (CN) .......................... 202110273561.9

(51) Int. Cl.
  *G06F 12/0802*  (2016.01)
  *G06F 12/0877*  (2016.01)
(52) U.S. Cl.
  CPC ...... *G06F 12/0877* (2013.01); *G06F 12/0802* (2013.01); *G06F 2212/1024* (2013.01)

(58) Field of Classification Search
  None
  See application file for complete search history.

(56) References Cited

U.S. PATENT DOCUMENTS

2016/0085446 A1* 3/2016 Kumabe ............... G06F 3/0649
                                                  711/146

* cited by examiner

*Primary Examiner* — Charles J Choi
(74) *Attorney, Agent, or Firm* — Joseph Mencher (57) ABSTRACT

A data-relationship-based FAST cache system includes a storage controller that is coupled to first storage device(s) and second storage device(s). The storage controller identifies a relationship between first data stored in the first storage device(s) and second data stored in the first storage device (s), with the relationship based on a difference between a first number of accesses of the first data associated with a first time period and a second number of accesses of the second data associated with the first time period being within an access difference threshold range. Subsequent to identifying the relationship, the storage controller determines that the first data has been accessed in the first storage device(s) a number of times within a second time period that exceeds a FAST cache threshold and, in response, moves both the first data and the second data to the second storage device(s) based on the relationship.

20 Claims, 9 Drawing Sheets

DATA-RELATIONSHIP-BASED FAST CACHE SYSTEM

CROSS-REFERENCE TO RELATED APPLICATIONS

The present application claims priority to Chinese Patent Application Serial No. 202110273561.9, filed on Mar. 12, 2021, the disclosure of which is incorporated herein by reference in its entirety.

BACKGROUND

The present disclosure relates generally to information handling systems, and more particularly to moving different data to enable quicker access to that data in storage information handling systems based on relationships between the different data.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, storage systems, are often utilized by other information handling systems such as, for example, server devices, in order to store and retrieve data. Furthermore, storage systems often include storage devices with different storage capabilities, including Hard Disk Drive (HDD) storage devices that provide relatively slower data storage and/or retrieval times, and Solid-State Drive (SSD) storage devices that provide relatively faster data storage and/or retrieval times. "Fully Automated Storage Tiering (FAST) cache" systems have been developed for such storage systems in order to provide for the more efficient storage and/or retrieval of data, and operate to identify data "chunk(s)" that are stored in the HDD storage device(s) and that are accessed frequently, and move those frequently accessed data chunk(s) to the SSD storage device(s) in order to take advantage of the relatively faster data storage and/or retrieval times of those SSD storage device(s). However, conventional FAST cache systems treat all data chunks independently, and the inventors of the present disclosure have discovered that such independent data chunk treatment introduces inefficiencies in those conventional FAST cache systems.

Accordingly, it would be desirable to provide a FAST cache system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage controller engine that is configured to: identify a relationship between first data that is stored in at least one first storage device and second data that is stored in the at least one first storage device, wherein the relationship is based on a difference between a first number of accesses of the first data associated with a first time period and a second number of accesses of the second data associated with the first time period being within an access difference threshold range; determine, subsequent to identifying the relationship, that the first data has been accessed in the at least one first storage device a number of times within a second time period that exceeds a cache threshold; and move, in response to determining that the first data has been accessed the number of times within the second time period that exceeds the cache threshold and based on the relationship identified between the first data and the second data, both the first data and the second data to at least one second storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
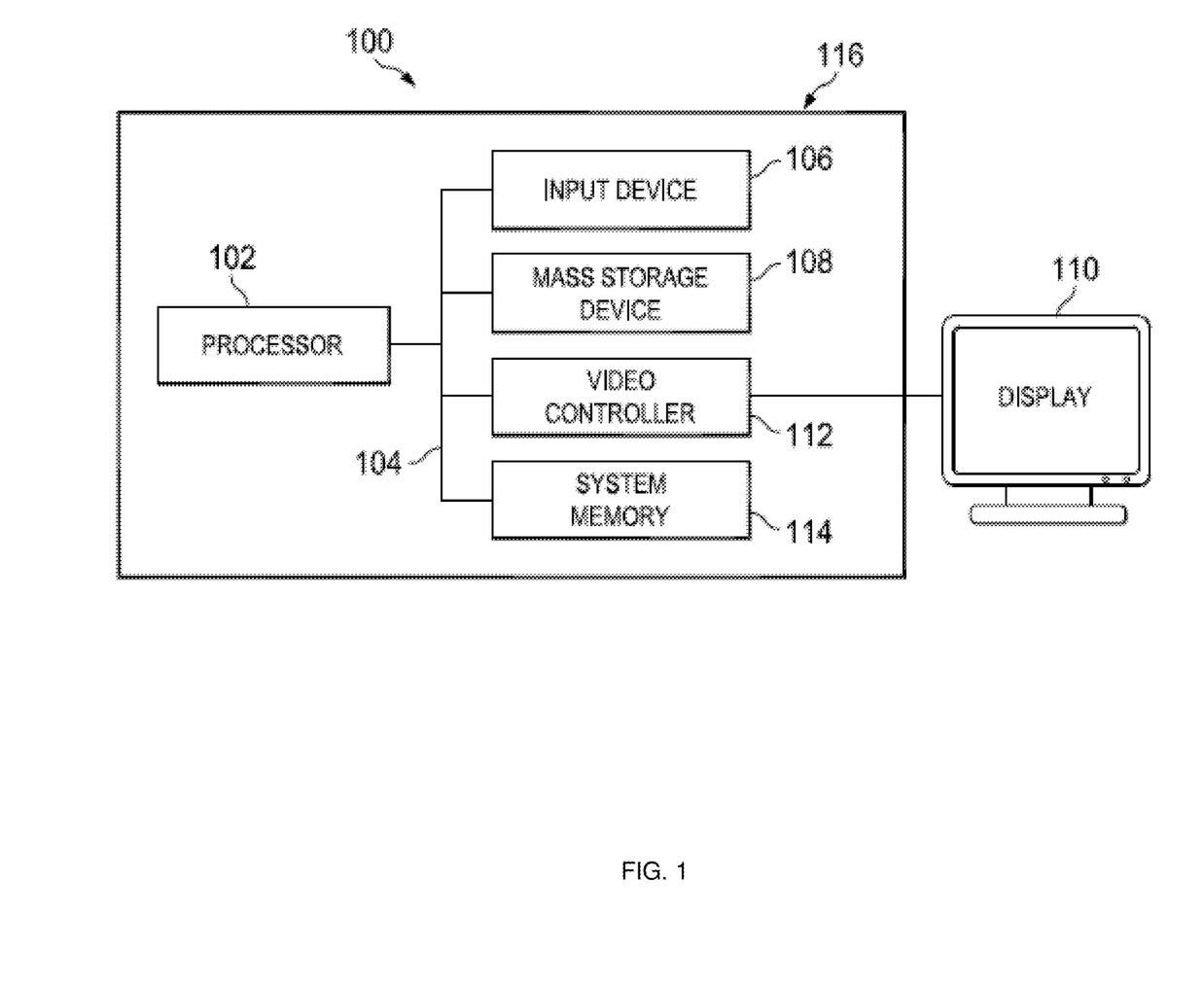
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
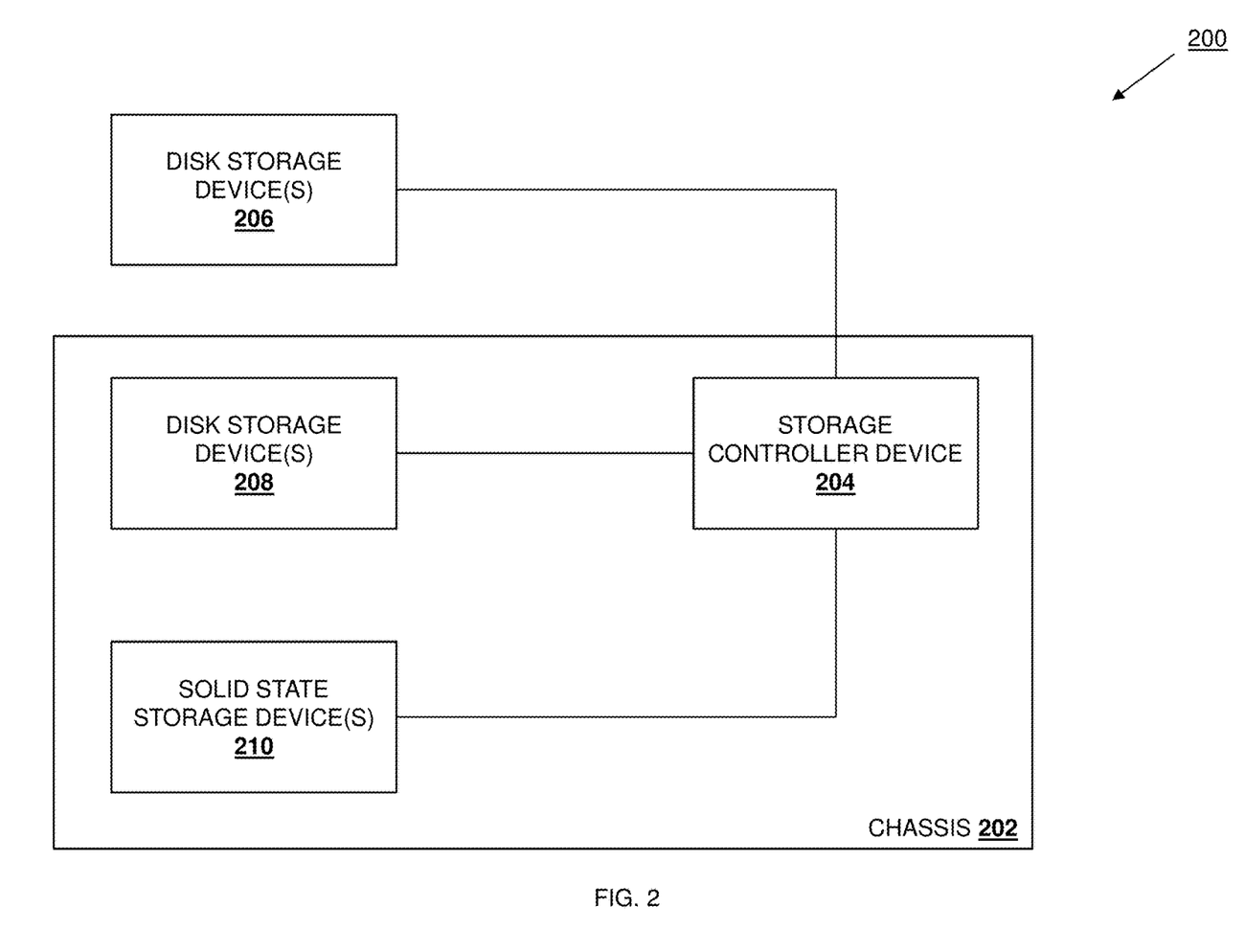
FIG. 2 is a schematic view illustrating an embodiment of a storage system that may utilize the data-relationship-based FAST cache system of the present disclosure.

Referring now to FIG. 2, an embodiment of a storage system 200 is illustrated. In the illustrated embodiment, the storage system 200 includes a chassis 202 that may be provided by a storage rack or other storage enclosures known in the art. In the illustrated embodiment, a storage controller device 204 is included in the chassis 202. In an embodiment, the storage controller device 204 may be provided by the IHS 100 discussed above with reference to FIG. 1, and/or may include some or all of the components of the IHS 100. However, while illustrated and discussed as being provided by a storage controller device, one of skill in the art in possession of the present disclosure will recognize that the storage controller device 204 provided in the system 200 may be replaced by any devices that may be configured to operate similarly as the storage controller device 204 discussed below. In the illustrated embodiment, the storage system 200 includes one or more disk storage devices 206 that are located outside of the chassis 202 and coupled to the storage controller device 204, one or more disk storage devices 208 that are housed in the chassis 202 and coupled to the storage controller device 204, and one or more solid-state storage devices 210 that are housed in the chassis 202 and coupled to the storage controller device 204. In the examples below, the disk storage device(s) 206 and 208 are provided by Hard Disk Drive (HDD) storage devices, while the solid-state storage device(s) 210 are provided by Solid State Drive (SSD) storage device.

However, while specific storage devices are illustrated and described in the examples provide herein, one of skill in the art in possession of the present disclosure will recognize that the storage system 200 may include a variety of different types of first storage device(s) with relatively slow data storage and/or retrieval times, and a variety of different types of second storage device(s) with relatively fast data storage and retrieval times. As such, the disk storage device(s) 206 and 208 (e.g., HDD storage devices) discussed below that include relatively slow data storage and/or retrieval times may be replaced by other types of storage devices, and the solid-state storage device(s) 210 (e.g., SDD storage devices) discussed below that include relatively fast data storage and/or retrieval times may be replaced by other types of storage devices (e.g., other flash storage devices, etc.) while remaining within the scope of the present disclosure as well. Furthermore, while a specific storage system 200 has been illustrated and described, one of skill in the art in possession of the present disclosure will recognize that the storage system of the present disclosure may include a variety of components and component configurations while remaining within the scope of the present disclosure as well.

Figure 3:
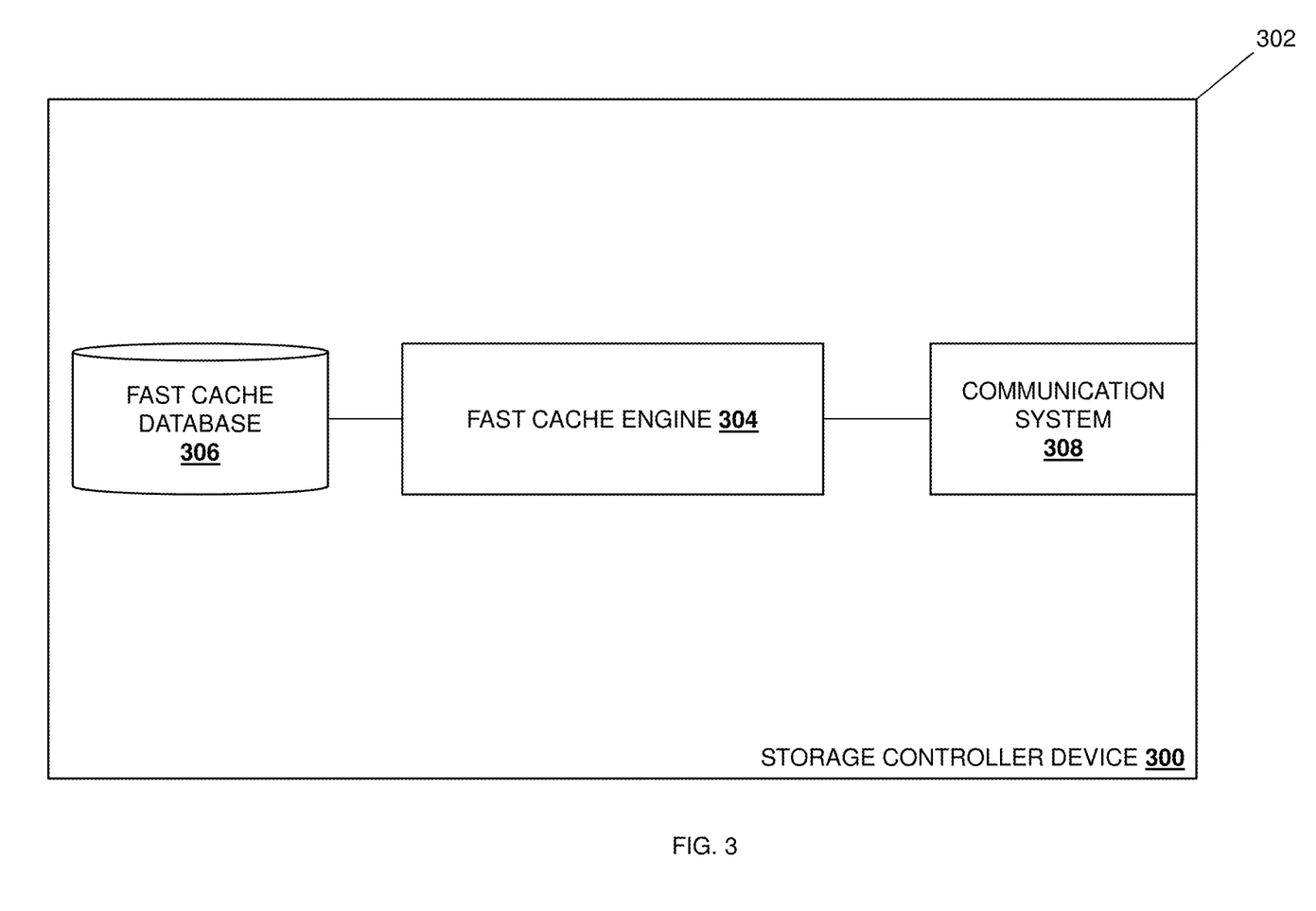
FIG. 3 is a schematic view illustrating an embodiment of a storage controller device that may be provided in the storage system of FIG. 2.

Referring now to FIG. 3, an embodiment of a storage controller device 300 is illustrated that may provide the storage controller device 204 discussed above with reference to FIG. 2. As such, the storage controller device 300 may be provided by the IHS 100 discussed above with reference to FIG. 1 and/or may include some or all of the components of the IHS 100. Furthermore, while illustrated and discussed as being provided by a storage controller device, one of skill in the art in possession of the present disclosure will recognize that the functionality of the storage controller device 300 discussed below may be provided by other devices that are configured to operate similarly as the storage controller device 300 discussed below. In the illustrated embodiment, the storage controller device 300 includes a chassis 302 (e.g., an enclosure, a circuit board, etc.) that houses or supports the components of the storage controller device 300, only some of which are illustrated below. For example, the chassis 302 may house or support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Fully Automated Storage Tiering (FAST) cache engine 304 that is configured to perform the functionality of the FAST cache engines and/or storage controller devices discussed below. However, while the cache system of the present disclosure is discussed below as being provided by a Fully Automated Storage Tiering (FAST) cache system, one of skill in the art in possession of the present disclosure will recognize that other cache systems will benefit from the teachings of the present disclosure and thus will fall within its scope as well.

The chassis 302 may also house a storage system (not illustrated, but which may include the storage 108 discussed above with reference to FIG. 1) that is coupled to the FAST cache engine 304 (e.g., via a coupling between the storage system and the processing system) and that includes a FAST cache database 306 that is configured to store any of the information utilized by the FAST cache engine 304 discussed below. The chassis 302 may also house a communication system 308 that is coupled to the FAST cache engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would one of skill in the art in possession of the present disclosure would recognize as providing the couplings to the storage devices 206, 208, and 210. However, while a specific storage controller device 300 has been illustrated, one of skill in the art in possession of the present disclosure will recognize that storage controller devices (or other devices operating according to the teachings of the present disclosure in a manner similar to that described below for the storage controller device 300) may include a variety of components and/or component configurations for providing conventional storage controller device functionality, as well as the functionality discussed below, while remaining within the scope of the present disclosure as well.

Figure 4:
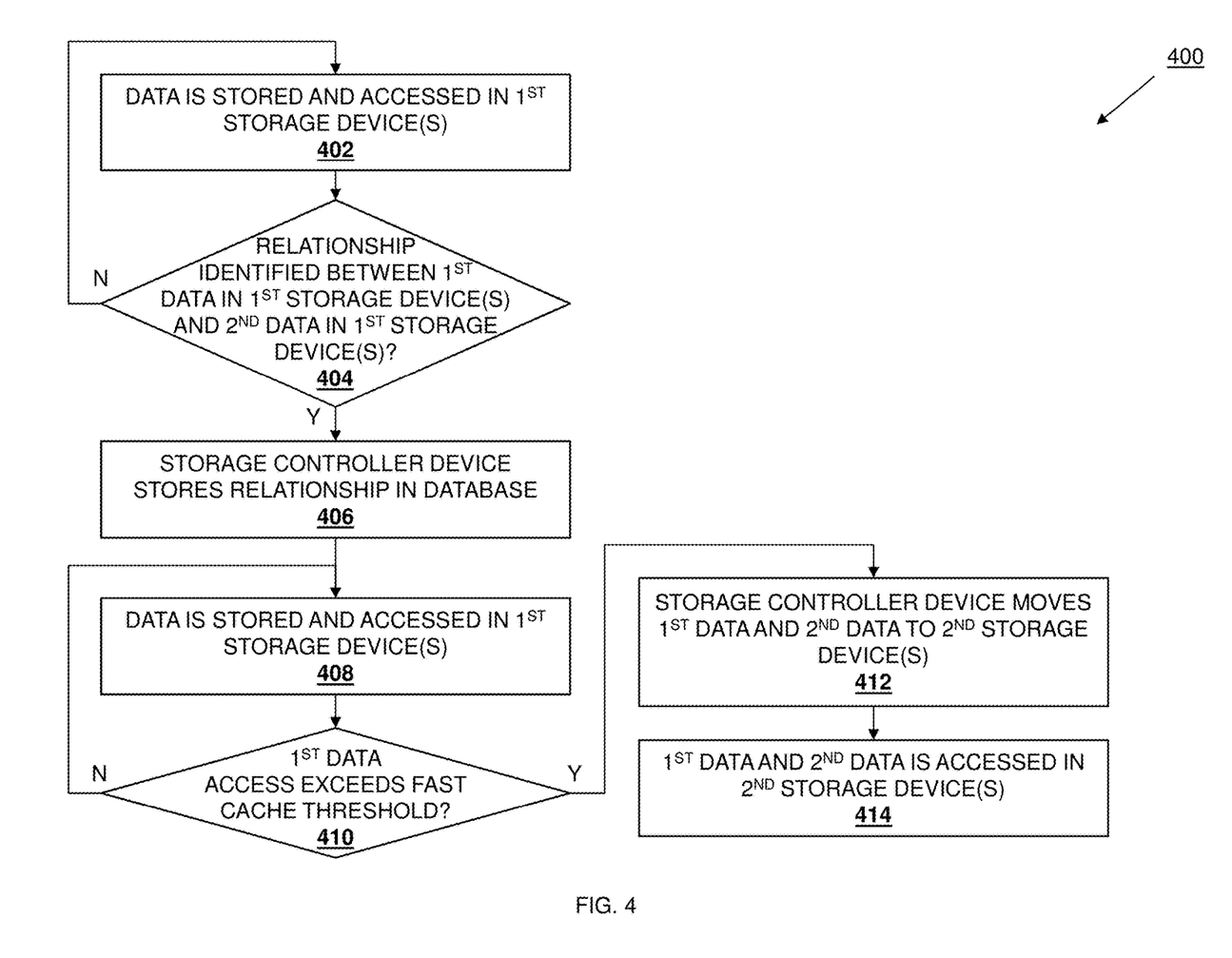
FIG. 4 is a flow chart illustrating an embodiment of a method for performing data-relationship-based FAST cache operations.

Referring now to FIG. 4, an embodiment of a method 400 for performing data-relationship-based FAST cache operations is illustrated. As discussed below, the systems and methods of the present disclosure provide for the identification of relationships between first and second data stored in first storage device(s) with relatively slow storage and/or retrieval times, and when the first data qualifies for movement to a second storage device(s) with relatively fast storage and/or retrieval times based on FAST cache criteria, the second data is moved along with the first data to the second storage device(s) based on the identified relationship. For example, the data-relationship-based FAST cache system of the present disclosure may include a storage controller that is coupled to first storage device(s) and second storage device(s). The storage controller identifies a relationship between first data stored in the first storage device(s) and second data stored in the first storage device (s), with the relationship based on a difference between a first number of accesses of the first data associated with a first time period and a second number of accesses of the second data associated with the first time period being within an access difference threshold range. Subsequent to identifying the relationship, the storage controller determines that the first data has been accessed in the first storage device(s) a number of times within a second time period that exceeds a FAST cache threshold and, in response, moves both the first data and the second data to the second storage device(s) based on the relationship. Thus, the systems and methods of the present disclosure move relatively frequently accessed data to FAST cache storage devices quicker than conventional FAST cache systems, thus improving the access/retrieval (e.g., read/write) efficiency of FAST cache systems.

The method 400 begins at block 402 where data is stored and accessed in first storage device(s). With reference to FIG. 2, in an embodiment of block 402, data may be stored in the disk storage device(s) 206 and/or 208. In the specific examples provided below, the different data discussed below is stored in the storage system 200 in 64 KB data "chunks", although one of skill in the art in possession of the present disclosure will appreciate that the teachings of the present disclosure may be applied to data stored at different sizes and/or in other manners while remaining within the scope of the present disclosure. As discussed above, the disk storage device(s) 206 and 208 may include relatively slower storage and/or retrieval times for data chunks stored therein, while the solid-state storage device(s) 210 may include relatively faster storage and/or retrieval times for data chunks stored therein, and in the examples below at least a portion of the solid-state storage device(s) 210 may be configured for utilization with the data-relationship-based FAST cache system of the present disclosure to store relatively frequently accessed data chunks, while the disk storage device(s) 206 and 208 may operate to store data chunks that are accessed relatively infrequently (or before those data chunks are identified as being accessed relatively frequently).

Thus, data chunks and/or other data that is written to the storage system (e.g., by server devices coupled to the storage system, not illustrated) may be initially stored in the disk storage device(s) 206 and/or 208, and may be subsequently accessed (e.g., by the server devices) at block 402 from the disk storage device(s) 206 and/or 208. However, as discussed below, it may be determined that data chunks and/or other data stored in the solid-state storage device(s) 210 are being infrequently accessed and, in response, those data chunks and/or that data may be moved to the disk storage device(s) 206 and/or 208 and, at block 402, may be subsequently accessed in a similar manner. As will be appreciated by one of skill in the art in possession of the present disclosure, in some embodiments of block 402, the FAST cache engine 304 in the storage controller device 300/204 may assist in the storage of the data chunks and/or other data in the disk storage device(s) 206 and/or 208, and/or the retrieval of the data chunks and/or other data from the disk storage device(s) 206 and/or 208. However, in other embodiments, at block 402 the FAST cache engine 304 in the storage controller device 300/204 may monitor the storage of data chunks and/or other data by some other storage subsystem in the disk storage device(s) 206 and/or 208, and/or monitor the retrieval of the data chunks and/or other data by some other storage subsystem from the disk storage device(s) 206 and/or 208, while remaining within the scope of the present disclosure as well.

Figure 5:
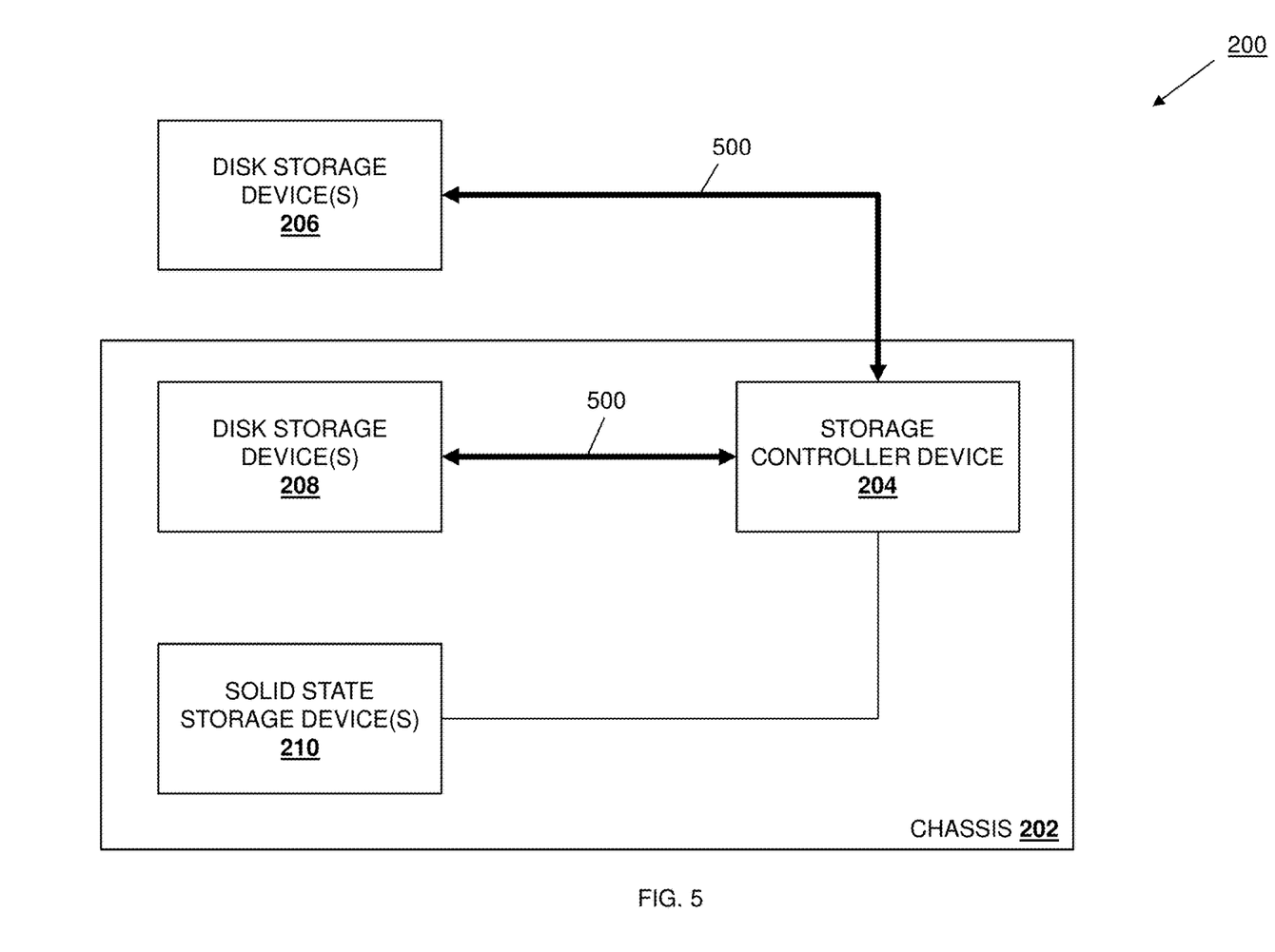
FIG. 5 is a schematic view illustrating an embodiment of the operation of the storage system of FIG. 2 during the method of FIG. 4.

The method 400 then proceeds to decision block 404 where it is determined whether a relationship is identified between first data in the first storage device(s) and second data in the first storage device(s). With reference to FIG. 5, in an embodiment of decision block 404, the FAST cache engine 304 in the storage controller device 300/204 may perform data relationship identification operations 500 that may include monitoring the retrieval of data chunks and/or other data from the disk storage device(s) 206 and/or 208 in order to determine which data chunks and/or other data are frequently accessed together. For example, one of skill in the art in possession of the present disclosure will appreciate how storage systems may store one or more "second" data chunks that will be accessed when a first data chunk is accessed (e.g., server systems initially accessing the first data chunk will repeatedly subsequently access the second data chunk(s) as well), and thus those second data chunks may be considered as having a "relationship" with the first data chunk. In the specific embodiments described herein, the specific notation described below is utilized to describe the data relationship identification operations performed by the FAST cache engine 304/storage controller device 300 at decision block 404, but one of skill in the art in possession of the present disclosure will appreciate that other data relationship identification techniques will fall within the scope of the present disclosure as well.

In the examples below, the number of times a data chunk $c_i$ has been accessed in a time period $(k-1, k)$ may be defined as:
$A(c_i)[k]$
where
$k \in \mathbb{N}$ As such, a sequence of the number of times a data chunk $c_i$ has been accessed may be defined as:
$\{A(c_i)[k]\}$
where
$k \in \mathbb{N}$ The difference between a number of times a data chunk $c_i$ has been accessed and a number of times a data chunk $c_j$ has been accessed (i.e., $A(c_j)[k]-A(c_i)[k]$ as defined above) in a time period $(k-1, k)$ may then be defined as:
$D(c_i,c_j)$ [k]
where
$k \in \mathbb{N}$ As such, a sequence of $D(c_i, c_j)[k]$ may be defined as:
$\{D(c_i,c_j)[k]\}$
where
$k \in \mathbb{N}$ A random variable may then be defined that represents a difference between a number of times a data chunk $c_i$ has been accessed and a number of times a data chunk $c_j$ has been accessed at any point in time:
$D(c_i,c_j)$ One of skill in the art in possession of the present disclosure will appreciate that all the possible values in the sequence $\{D(c_i, c_j)[k]\}$ form the sample space of $D(c_i, c_j)$.

An expected value of a discrete random variable $D(c_i, c_j)$ may then be defined as:
$\mu_{ij}$ A variance of a discrete random variable $D(c_i, c_j)$ may then be defined as:

$$\sigma_{ij}^2$$

An estimated expected value of $D(c_i, c_j)$ at a point in time k may then be defined as:
$\tilde{\mu}_{ij}[k]$ Finally, an estimated variance of at a point in time k may be defined as:

$$\tilde{\sigma}_{ij}^2[k]$$

In the specific examples of the data relationship identification operations provided below, the data chunks are 64 KB in size, and the time period $(1-k, k)$ for use in determining whether relationships between data chunks exists is 1 hour, but one of skill in the art in possession of the present disclosure will appreciate that different data sizes and different time periods will fall within the scope of the present disclosure as well.

Thus, at decision block 404, the FAST cache engine 304 in the storage controller device 300/204 may monitor the number of times any 64 KB data chunk $c_i$ has been accessed within a 1-hour time period $(k-1, k)$ (i.e., $A(c_i)[k]$ as defined above). Furthermore, in order to determine whether a relationship exists between any two 64 KB data chunks $c_i$ and $c_j$, the difference between a number of times the data chunk $c_i$ has been accessed and the number of times a data chunk $c_j$ has been accessed at any time k may be provided by $A(c_i)[k]-A(c_j)[k]=D(c_i, c_j)[k]$. As discussed above, $D(c_i, c_j)$ may be defined as a discrete random variable, and all possible values in the sequence $D(c_i, c_j)[k]$ may form the sample space for $D(c_i, c_j)$, so the data relationship identification operations performed by the FAST cache engine 304 in the storage controller device 300/204 may take into account the expected value of $D(c_i, c_j)$ (e.g., $\mu_{ij}$ as defined above) and the variance of $D(c_i, c_j)$ (e.g., $\sigma^2_{ij}$ as defined above) for any pair of 64 KB data chunks.

The theoretical expected value of $D(c_i, c_j)[k]$ denoted by $\mu_{ij}$ may be calculated by:

$$\mu_{ij} = E[D(c_i, c_j)] = \lim_{N \to \infty} \frac{1}{2N} \sum_{n=-N}^{N} D(c_i, c_j)[n]$$

However, the expected value and variance of $D(c_i, c_j)$ can only be estimated within a finite data set of samples, so in a specific embodiment the expected value and variance of $D(c_i, c_j)$ at any particular point in time k may be calculated by:

$$\tilde{\mu}_{ij}[k] = \frac{1}{168} \sum_{n=k-167}^{k} D(c_i, c_j)[n]$$

$$\tilde{\sigma}_{ij}^2[k] = \frac{1}{168} \sum_{n=k-167}^{k} \{D(c_i, c_j)[n] - \tilde{\mu}_{ij}[k]\}^2$$

One of skill in the art in possession of the present disclosure will appreciate that the expected value and variance of $D(c_i, c_j)$ at any particular point in time k in the example above is estimated using data chunk monitoring over the previous 168 hours (i.e., 7 days), but other data chunk monitoring time periods will fall within the scope of the present disclosure as well.

One of skill in the art in possession of the present disclosure will appreciate that a relatively small value of $\tilde{\mu}_{ij}[k]$ indicates that the 64 KB data chunks $c_i$ and $c_j$ being considered have, on average, a similar frequency of access, while a relatively small variance $$\tilde{\sigma}_{ij}^2[k]$$

implies that a trend of the change of the number of accesses of the pair of 64 KB data chunks $c_i$ and $c_j$ being considered are also similar. Thus, in some embodiments, the FAST cache engine 304 in the storage controller device 300/204 may perform the data relationship identification operations by identifying that a relationship between any two 64 KB data chunks $c_i$ and $c_j$ exists when the following inequations are satisfied:

$$-1 \le \tilde{\mu}_{ij}^2[k] \le 1$$

$$\tilde{\sigma}_{ij}^2[k] \le 1$$

However, while specific inequations for identifying when a relationship between any two data chunks exists are provided above, one of skill in the art in possession of the present disclosure will appreciate that the data relationship of the present disclosure may be defined in different manners and using different techniques that will fall within the scope of the present disclosure as well.

If, at decision block 404, no relationship is identified between first data in the first storage device(s) and second data in the first storage device(s), the method 400 returns to block 402. For example, at decision block 404, the FAST cache engine 304 in the storage controller device 300/204 may determine that the value of $\hat{\mu}_{ij}[k]$ for any pair of 64 KB data chunks $c_i$ and $c_j$ is outside an access difference threshold range (e.g., less than −1 or greater than 1 in the example above), or may determine that the value of $$\hat{\sigma}_{ij}^2[k]$$

for any pair of 64 KB data chunks $c_i$ and $c_j$ is above a difference variance threshold (e.g., greater than 1 in the example above), and thus may determine that no relationship exists between those pair of 64 KB data chunks $c_i$ and $c_j$. In other words, for any pair of 64 KB data chunks $c_i$ and $c_j$, no relationship will be identified if the expected value of $D(c_i, c_j)$ at any particular point in time k is outside the access difference threshold range, and even if the expected value of $D(c_i, c_j)$ at any particular point in time k is with the access difference threshold range, no relationship will be identified if the variance of $D(c_i, c_j)$ at the particular point in time k is greater than the difference variance threshold. In response do determining no relationship exists between the first and second data, the method 400 may loop such that data is stored and accessed in the storage device(s) 206 and/or 208 as long as no relationship is identified between any pair of first and second data stored in those data storage device(s) 206 and/or 208.

If, at decision block 404, a relationship is identified between first data in the first storage device(s) and second data in the first storage device(s), the method 400 proceeds to block 406 where a storage controller device stores the relationship in a database. For example, at decision block 404, the FAST cache engine 304 in the storage controller device 300/204 may determine that the value of $\hat{\mu}_{ij}[k]$ for any pair of 64 KB data chunks $c_i$ and $c_j$ is within the access difference threshold range (e.g., equal to or between −1 and 1 in the example above), and may determine that the value of $$\hat{\sigma}_{ij}^2[k]$$

for that pair of 64 KB data chunks $c_i$ and $c_j$ is above a difference variance threshold (e.g., less than or equal to 1 in the example above), and thus may determine that a relationship exists between those pair of 64 KB data chunks $c_i$ and $c_j$. In other words, for any pair of 64 KB data chunks $c_i$ and $c_j$, a relationship will be identified if both the expected value of $D(c_i, c_j)$ at any particular point in time k is with the access difference threshold range, and the variance of $D(c_i, c_j)$ at the particular point in time k is less than the difference variance threshold.

In an embodiment, at block 406 and in response to identifying the relationship, the FAST cache engine 304 in the storage controller device 300/204 may then store the relationship between the pair of 64 KB data chunks $c_i$ and $c_j$ in the FAST cache database 306. For example, with reference to FIG. 6, the FAST cache database 306 is illustrated with relationships identified between data chunks 600, 602, and 604, a data chunk 606 with no current relationship identified with any other data chunk, and a relationship identified between data chunks 608 and 610, and one of skill in the art in possession of the present disclosure will appreciate how the FAST cache engine 304 in the storage controller device 300/204 may perform the data relationship identification operations at decision block 404 detailed above to identify the relationship between any two data chunks illustrated in the FIG. 6 at block 406.

The method 400 then proceeds to block 408 where data is stored and accessed in the first storage device(s). In an embodiment, at block 408 and similarly as discussed above with reference to block 402, data may be stored in the disk storage device(s) 206 and/or 208. Thus, in an embodiment of block 408, data chunks and/or other data that was previously written to the storage system (e.g., by server devices coupled to the storage system, not illustrated) and stored in the disk storage device(s) 206 and/or 208 may be accessed (e.g., by the server devices) from the disk storage device(s) 206 and/or 208. However, as also discussed above, in some embodiments of block 408, data chunks and/or other data stored in the solid-state storage device(s) 210 that were infrequently accessed and moved to the disk storage device(s) 206 and/or 208 (discussed in further detail below) may be accessed in the disk storage device(s) 206 and/or 208 in a similar manner. As will be appreciated by one of skill in the art in possession of the present disclosure, in some embodiments of block 408, the FAST cache engine 304 in the storage controller device 300/204 may assist in the retrieval of the data chunks and/or other data from the disk storage device(s) 206 and/or 208. However, in other embodiments, at block 402 the FAST cache engine 304 in the storage controller device 300/204 may monitor the retrieval of the data chunks and/or other data by some other storage subsystem from the disk storage device(s) 206 and/or 208 while remaining within the scope of the present disclosure as well.

Figure 7:
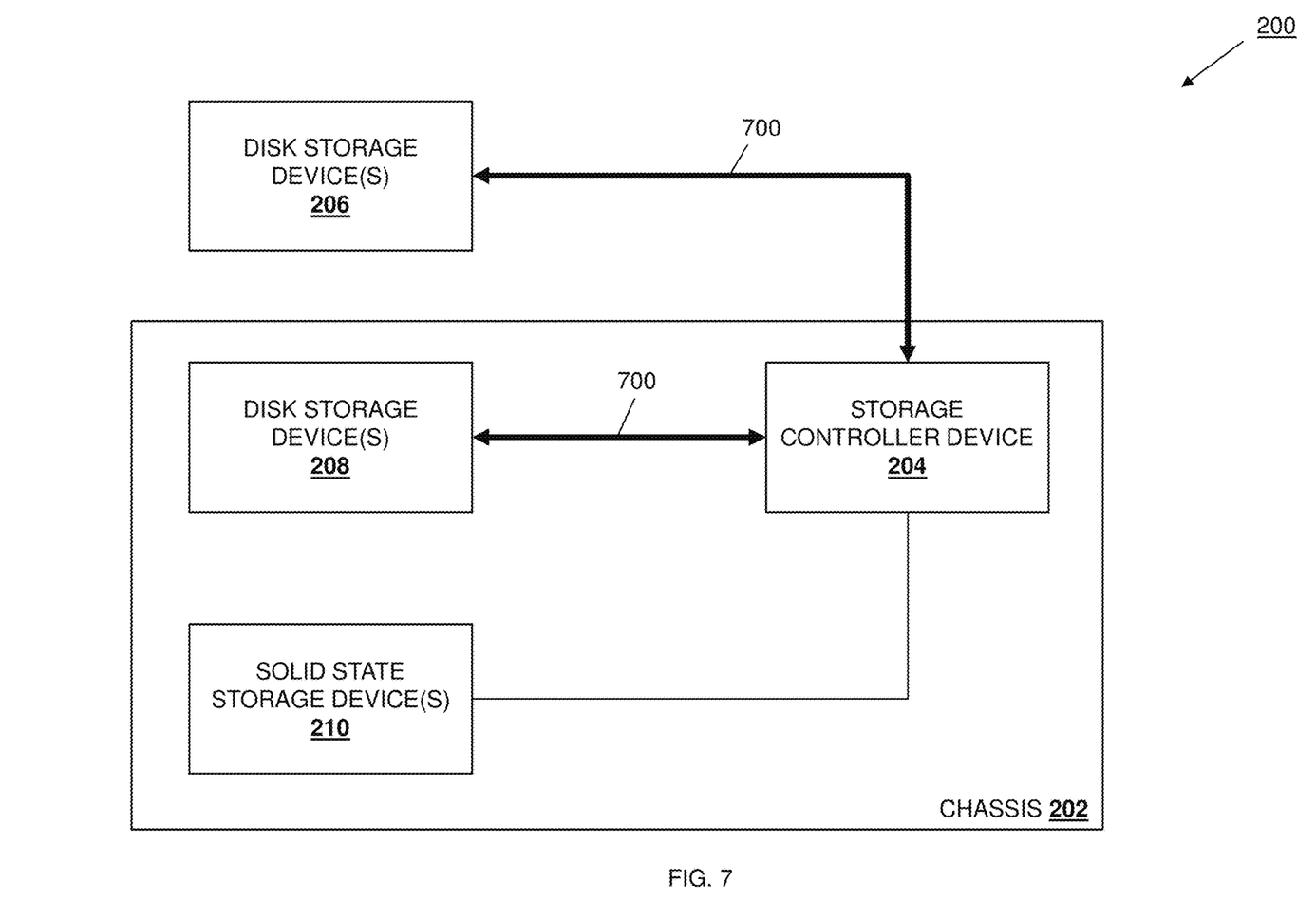
FIG. 7 is a schematic view illustrating an embodiment of the operation of the storage system of FIG. 2 during the method of FIG. 4.

The method 400 then proceeds to decision block 410 where it is determined whether first data access exceeds a FAST cache threshold. With reference to FIG. 7, in an embodiment of decision block 410, the FAST cache engine 304 in the storage controller device 300/204 may perform data access threshold monitoring operations 700 that may include monitoring the retrieval of data chunks and/or other data from the disk storage device(s) 206 and/or 208. Thus, for any "first" data chunk (e.g., the data chunk 600 or the data chunk 608 in the examples below), the FAST cache engine 304 in the storage controller device 300/204 may determine whether that data chunk is accessed more than an access threshold number of times in an access threshold time period. In a specific example, the access threshold number of times may be 3, while the access threshold time period may be 1 minute, although one of skill in the art in possession of the present disclosure will appreciate that the access threshold number of times and/or the access threshold time period may be different, and/or that the FAST cache threshold may utilize different metrics (other then the number of times data is accessed within a time period) while remaining within the scope of the present disclosure as well.

If, at decision block 410, the first data access does not exceed the FAST cache threshold, the method 400 returns to block 408. In an embodiment, at block 408 and in response to determining that no data chunk in the disk data storage device(s) 206 and 208 has been accessed in a manner that exceeds the FAST cache threshold (e.g., no data chunk has been accessed at least the access threshold number of times within the access threshold time period), the method 400 may loop such that data chunks and/or other data is stored and accessed in the disk storage device(s) 206 and/or 208 as long as the access of any particular data chunk does not exceed the FAST cache threshold.

Figure 8:
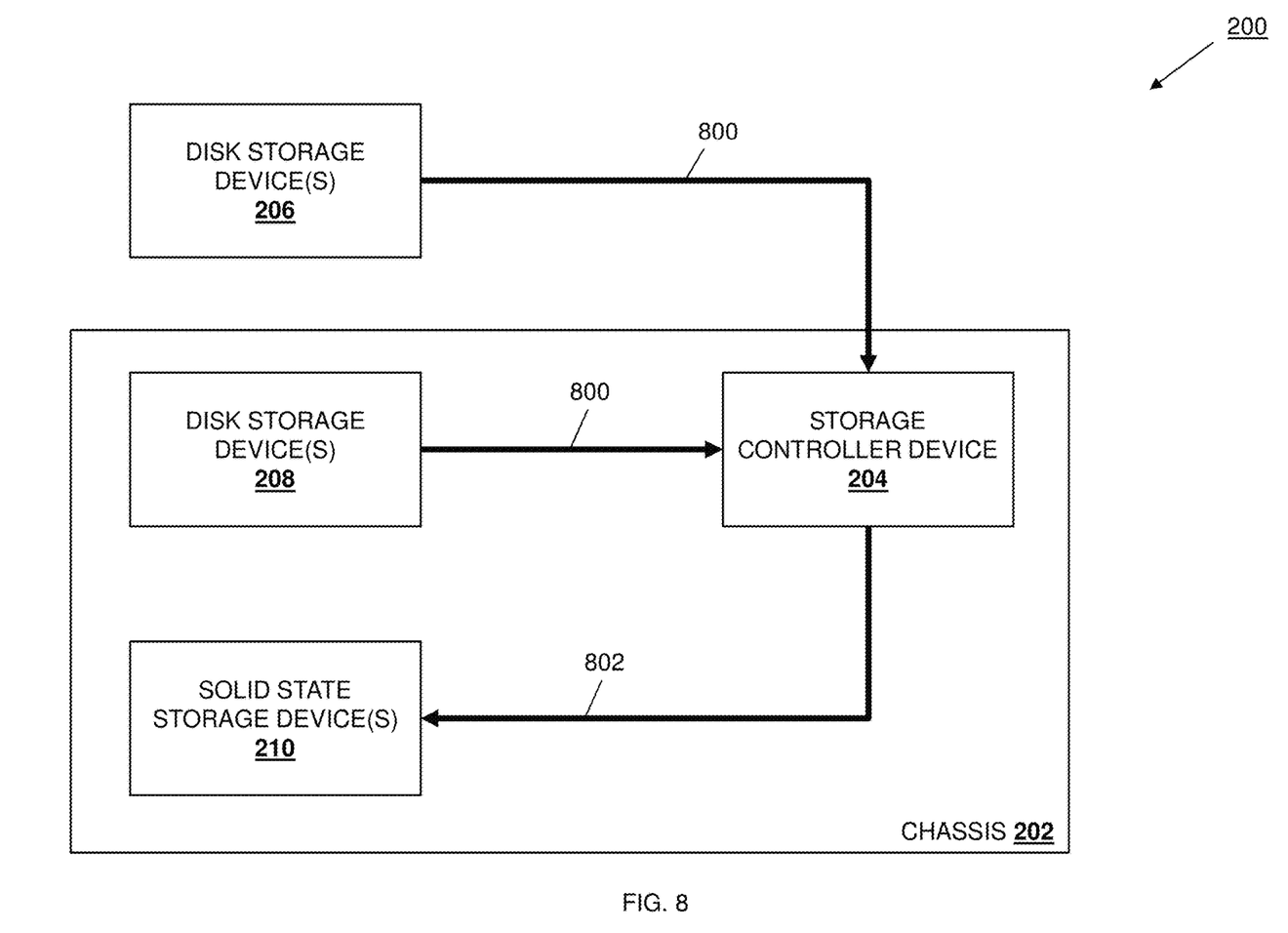
FIG. 8 is a schematic view illustrating an embodiment of the operation of the storage system of FIG. 2 during the method of FIG. 4.

If, at decision block 410, the first data access exceeds the FAST cache threshold, the method 400 proceeds to block 412 where the storage controller device moves the first data and the second data to second storage device(s). In an embodiment, at block 412 and in response to determining that a data chunk in the disk data storage device(s) 206 and 208 has been accessed in a manner that exceeds the FAST cache threshold (e.g., that data chunk has been accessed at least the access threshold number of times within the access threshold time period), the method 400 may proceed to block 412 where the FAST cache engine 304 in the storage controller device 300/204 may move that data chunk and any other data chunks that have a relationship with that data chunk to the solid-state storage device(s) 210. For example, with reference to FIG. 8, the FAST cache engine 304 in the storage controller device 300/204 may perform data chunk retrieval operations 800 in order to retrieve both the first data chunk that has been accessed in a manner that exceeds the FAST cache threshold, as well as any second data chunk(s) that were identified as having a relationship with that first data chunk at decision block 404. Furthermore, the FAST cache engine 304 in the storage controller device 300/204 may also perform data chunk storage operations 802 in order to store both that first data chunk and those second data chunk(s), in the solid-state storage device(s) 210.

Figure 6:
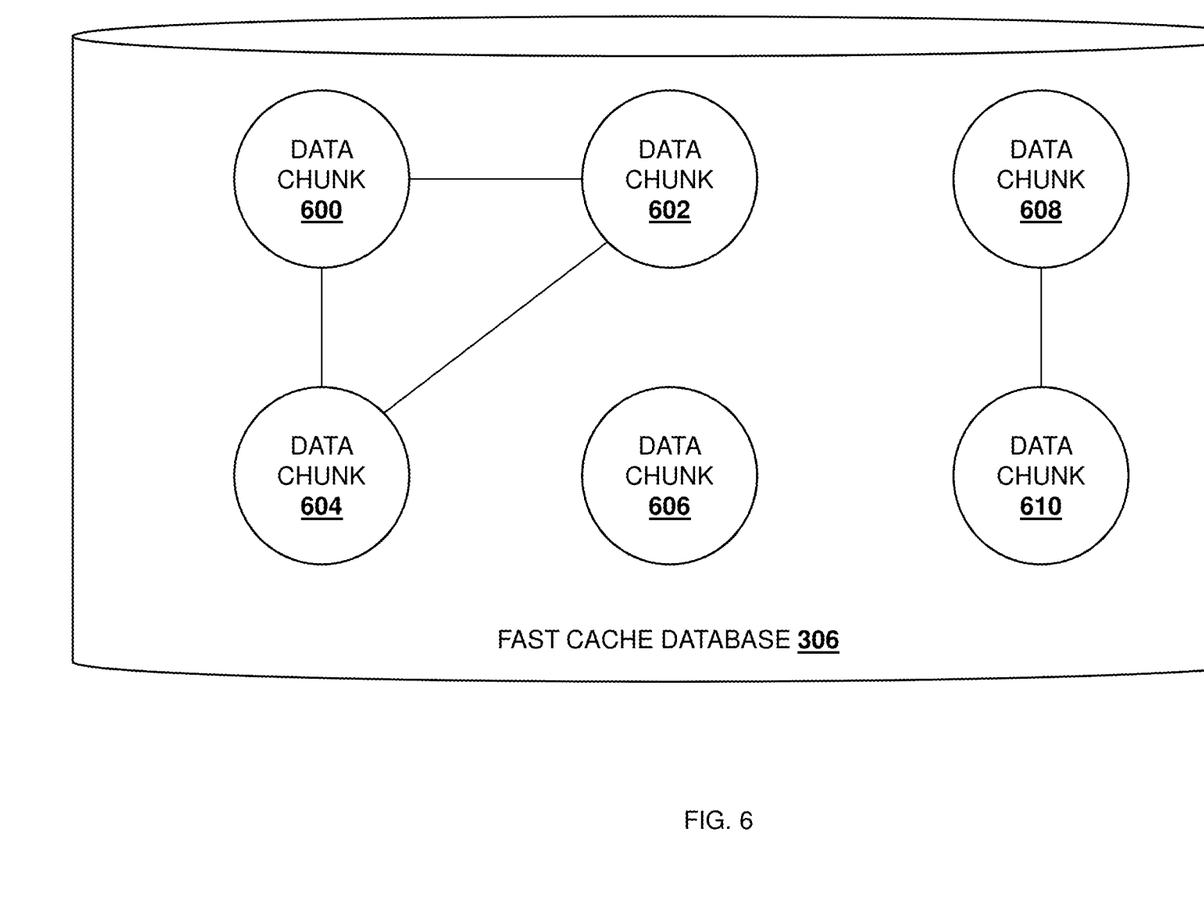
FIG. 6 is a graph view illustrating an embodiment of data relationship graph(s).

Thus, with reference to the specific data relationships identified above with regard to FIG. 6, at block 412 the FAST cache engine 304 in the storage controller device 300/204 may perform the data chunk retrieval operations 800 in order to retrieve both the data chunk 600 that has been accessed in a manner that exceeds the FAST cache threshold, as well as the data chunks 602 and 604 that were identified as having a relationship with the data chunk 600 at decision block 404. The FAST cache engine 304 in the storage controller device 300/204 may then perform the data chunk storage operations 802 in order to store the data chunks 600, 602, and 604 in the solid-state storage device(s) 210. Similarly, with reference to the specific data relationships identified above with regard to FIG. 6, at block 412 the FAST cache engine 304 in the storage controller device 300/204 may perform the data chunk retrieval operations 800 in order to retrieve both the data chunk 608 that has been accessed in a manner that exceeds the FAST cache threshold, as well as the data chunk 610 that was identified as having a relationship with the data chunk 600 at decision block 404. The FAST cache engine 304 in the storage controller device 300/204 may then perform the data chunk storage operations 802 in order to store the data chunks 608 and 610 in the solid-state storage device(s) 210. One of skill in the art in possession of the present disclosure will recognize that data chunk relationships illustrated in FIG. 6 may be considered "knowledge graphs", and may be utilized with relational machine learning operations in order to, for example, predict new characteristics of the data chunks (e.g., link prediction characteristics).

As will be appreciated by one of skill in the art in possession of the present disclosure, in some embodiment, the movement of the data chunks from the disk storage device(s) 206 and 208 to the solid-state storage device(s) 210 may be accompanied by the modification of data chunk location information (e.g., in the FAST cache database 306) in order to record the movement of those data chunks for purposes of future data chunk retrieval. As such, one of skill in the art in possession of the present disclosure will appreciate how the functionality of FAST cache engine 304 operates to improve the "FAST cache hit rate" and decrease the "FAST cache warm-up time" of conventional FAST cache systems by moving data chunks that will be frequently accessed (i.e., due to their relationship with another frequently accessed data chunk that has been accessed in a manner that exceeds the FAST cache threshold) to the solid-state storage device(s) 210 prior to those data chunks being accessed in a manner that exceeds the FAST cache threshold (i.e., conventional FAST cache systems would otherwise require each of those data chunks to be accessed in a manner that exceeds the FAST cache threshold before moving them to the solid-state storage device(s) 210.)

The method 400 then proceeds to block 414 where the first data and the second data is accessed in the second storage device(s). In an embodiment, at block 414 and following the movement of the first data chunk and second data chunk(s) from the disk storage device(s) 206 and/or 208 to the solid-state storage device(s) 210, that first data chunk and those second data chunk(s) may be accessed via the solid-state storage device(s) 210. As will be appreciated by one of skill in the art in possession of the present disclosure, in some embodiments of block 414, the FAST cache engine 304 in the storage controller device 300/204 may assist in the retrieval of the data chunks and/or other data from the solid-state storage device(s) 210. However, in other embodiments, at block 402 the FAST cache engine 304 in the storage controller device 300/204 may monitor the retrieval of the data chunks and/or other data by some other storage subsystem from the solid-state storage device(s) 210 while remaining within the scope of the present disclosure as well. While not explicitly illustrated or discussed herein, one of skill in the art in possession of the present disclosure will recognize that the monitoring of the retrieval of the data chunks and/or other data from the solid-state storage device(s) 210 by the FAST cache engine 304 in the storage controller device 300/204 allows the FAST cache engine 304 in the storage controller device 300/204 to determine when any data chunks or other data stored in the solid-state storage device(s) 210 are accessed below an FAST cache threshold and, in response, move those data chunks or other data back to the disk storage device(s) 206 and/or 208.

Figure 9:
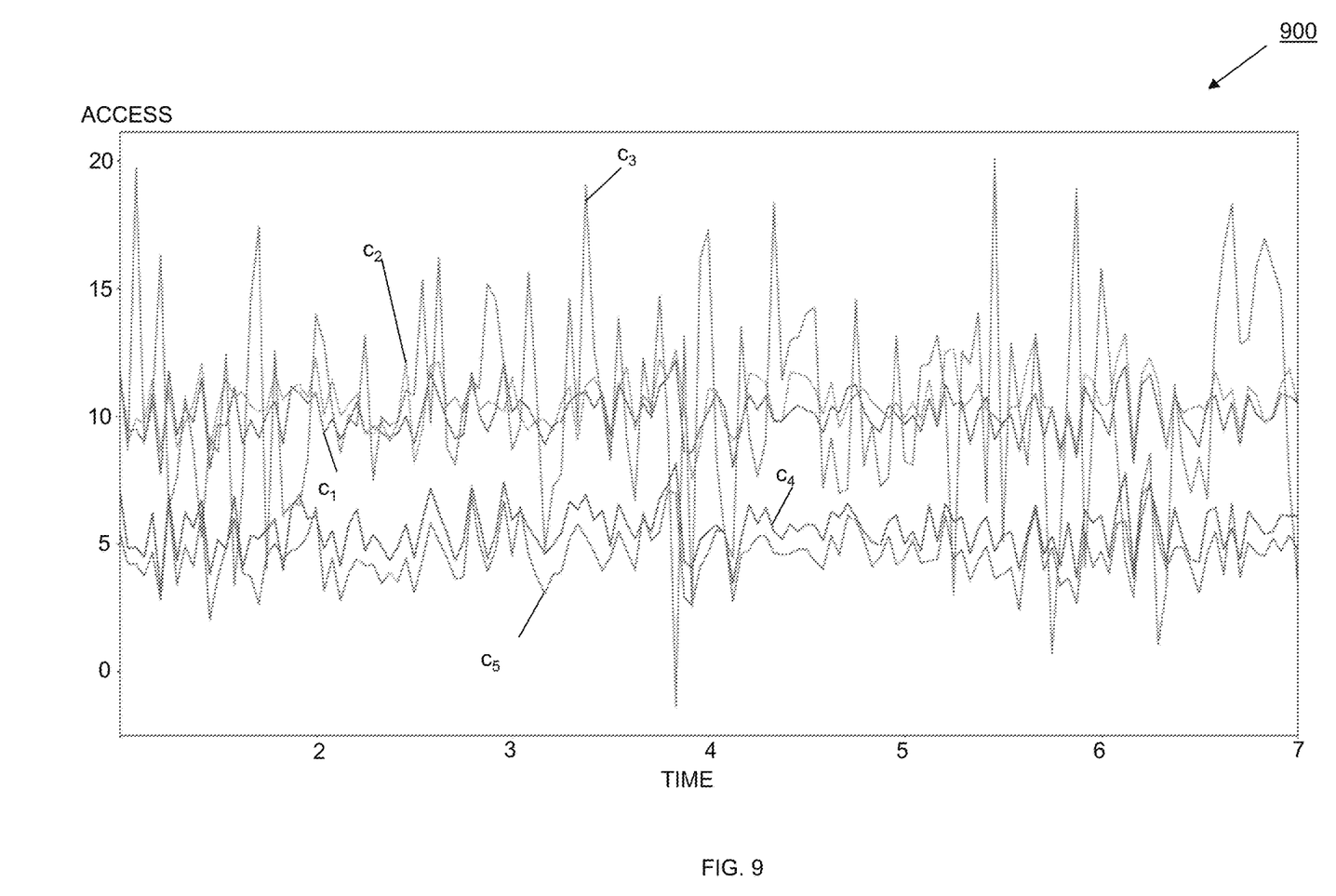
FIG. 9 is a graph view illustrating an experimental embodiment of access vs. time for different data chunks, and is utilized to confirm the data-relationship-based FAST cache operations of the present disclosure.

With reference to FIG. 9, an experimental embodiment 900 is illustrated in a graph that plots data chunk access (number of accesses) on the vertical axis and time (days) on the horizontal axis for data chunks $c_1$, $c_2$, $c_3$, $c_4$, and $c_5$. One of skill in the art in possession of the present disclosure viewing the graph in FIG. 9 will likely recognize that a relationship is likely to exist between the data chunks $c_1$ and $c_2$, as well as between the data chunks $c_4$ and $c_5$, and the data used to provide that graph may be analyzed using the techniques of the present disclosure to verify those relationships. For example, based on the data used to provide the graph in FIG. 9, the following table may be generated that includes the expected value and variance of $D(c_i, c_j)$ at any particular point in time k for each pair of data chunks $c_1$, $c_2$, $c_3$, $c_4$, and $c_5$ identified in the graph:

| | $\hat{\mu}_{ij}[k]$ | $\hat{\sigma}_{ij}^2[k]$ |
|---|---|---|
| $D(c_1, c_2)$ | −0.479824 | 0.598322 |
| $D(c_1, c_3)$ | −0.232123 | 18.527412 |
| $D(c_1, c_4)$ | 4.500640 | 0.067339 |

-continued

| | $\tilde{\mu}_{ij}[k]$ | $\tilde{\sigma}_{ij}^2[k]$ |
|---|---|---|
| D(c$_1$, c$_5$) | 5.471436 | 0.260982 |
| D(c$_2$, c$_3$) | 0.247701 | 18.329535 |
| D(c$_2$, c$_4$) | 4.980465 | 0.672342 |
| D(c$_2$, c$_5$) | 5.951260 | 0.876486 |
| D(c$_3$, c$_4$) | 4.732763 | 18.478064 |
| D(c$_3$, c$_5$) | 5.703558 | 18.908653 |
| D(c$_4$, c$_6$) | 0.970795 | 0.363134 |

As can be seen in the table above, $\tilde{\mu}_{12}[k]$ (the expected value of D(c$_1$, c$_2$)) is between −1 and 1, and $$\tilde{\sigma}_{12}^2[k]$$

(variance of D(c$_1$, c$_2$) below 1, and thus the relationship indicated in the graph between c$_1$ and c$_2$ is confirmed by the data relationship identification operations of the present disclosure. As can also be seen in the table above, $\tilde{\mu}_{45}[k]$ (the expected value of D(c$_4$, c$_5$)) is between −1 and 1, and $$\tilde{\sigma}_{45}^2[k]$$

(the variance of D(c$_4$, c$_5$)) is below 1, and thus the relationship indicated in the graph between c$_4$ and c$_5$ is confirmed by the data relationship identification operations of the present disclosure.

Thus, systems and methods have been described that provide for the identification of relationships between first and second data chunks stored in first HDD storage device(s) with relatively slow storage and/or retrieval times, and when the first data chunk qualifies for movement to SDD storage device(s) with relatively fast storage and/or retrieval times based on FAST cache criteria, the second data chunk is moved along with the first data chunk to the SDD storage device(s) based on the identified relationship. For example, the data-relationship-based FAST cache system of the present disclosure may include a storage controller that is coupled to HDD storage device(s) and SSD storage device(s). The storage controller identifies a relationship between a first data chunk stored in the HDD storage device(s) and second data chunk(s) stored in the HDD storage device (s), with the relationship based on a difference between a first number of accesses of the first data chunk associated with a first time period and a second number of accesses of the second data chunk(s) associated with the first time period being within an access difference threshold range. Subsequent to identifying the relationship, the storage controller determines that the first data chunk has been accessed in the HDD storage device(s) a number of times within a second time period that exceeds a FAST cache threshold and, in response, moves both the first data chunk and the second data chunk(s) to the SSD storage device(s) based on the relationship. Thus, the systems and methods of the present disclosure move relatively frequently accessed data chunks to FAST cache SSD storage devices quicker than conventional FAST cache systems, thus improving the access/retrieval (e.g., read/write) efficiency of FAST cache systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data-relationship-based cache system, comprising:
  at least one first storage device;
  at least one second storage device;
  a storage controller device that is coupled to the at least one first storage device and the at least one second storage device, wherein the storage controller device is configured to:
    identify a relationship between first data that is stored in the at least one first storage device and second data that is stored in the at least one first storage device, wherein the relationship is based on a difference between a first number of accesses of the first data associated with a first time period and a second number of accesses of the second data associated with the first time period being within an access difference threshold range;
    determine, subsequent to identifying the relationship, that the first data has been accessed in the at least one first storage device a number of times within a second time period that exceeds a cache threshold; and
    move, in response to determining that the first data has been accessed the number of times within the second time period that exceeds the cache threshold and based on the relationship identified between the first data and the second data, both the first data and the second data to the at least one second storage device.

2. The system of claim 1, wherein the at least one first storage device is a Hard Disk Drive (HDD) storage device, and wherein the at least one second storage device is a Solid-State Drive (SSD) storage device.

3. The system of claim 1, wherein the first data is provided by a first data chunk, and wherein the second data is provided by at least one second data chunk.

4. The system of claim 1, wherein the relationship is based on a variance of the difference between the first number of accesses of the first data associated with the first time period and the second number of accesses of the second data associated with the first time period being above a difference variance threshold.

5. The system of claim 1, wherein the storage controller device is configured to:
  receive, prior to identifying the relationship between the first data and the second data, a first access request identifying the first data and, in response, retrieve the first data from the at least one first storage device; and
  receive, subsequent to identifying the relationship between the first data and the second data and moving both the first data and the second data to the at least one second storage device, a second access request identifying the first data and, in response, retrieve the first data from the at least one second storage device.

6. The system of claim 1, wherein the difference between the first number of accesses of the first data associated with the first time period and the second number of accesses of the second data associated with the first time period is provided by an expected difference value at a point in time that is based on the difference between the first number of accesses of the first data within the first time period and the second number of accesses of the second data within the first time period.

7. An Information Handling System (IHS), comprising:
a processing system; and
a memory system that is coupled to the processing system and that includes instructions that, when executed by the processing system, cause the processing system to provide a cache engine that is configured to:
identify a relationship between first data that is stored in at least one first storage device and second data that is stored in the at least one first storage device, wherein the relationship is based on a difference between a first number of accesses of the first data associated with a first time period and a second number of accesses of the second data associated with the first time period being within an access difference threshold range;
determine, subsequent to identifying the relationship, that the first data has been accessed in the at least one first storage device a number of times within a second time period that exceeds a cache threshold; and
move, in response to determining that the first data has been accessed the number of times within the second time period that exceeds the cache threshold and based on the relationship identified between the first data and the second data, both the first data and the second data to at least one second storage device.

8. The IHS of claim 7, wherein the at least one first storage device is a Hard Disk Drive (HDD) storage device, and wherein the at least one second storage device is a Solid-State Drive (SSD) storage device.

9. The IHS of claim 7, wherein the first data is provided by a first data chunk, and wherein the second data is provided by at least one second data chunk.

10. The IHS of claim 7, wherein the relationship is based on a variance of the difference between the first number of accesses of the first data associated with the first time period and the second number of accesses of the second data associated with the first time period being above a difference variance threshold.

11. The IHS of claim 7, wherein the cache engine is configured to:
receive, prior to identifying the relationship between the first data and the second data, a first access request identifying the first data and, in response, retrieve the first data from the at least one first storage device; and
receive, subsequent to identifying the relationship between the first data and the second data and moving both the first data and the second data to the at least one second storage device, a second access request identifying the first data and, in response, retrieve the first data from the at least one second storage device.

12. The IHS of claim 7, wherein the difference between the first number of accesses of the first data associated with the first time period and the second number of accesses of the second data associated with the first time period is provided by an expected difference value at a point in time that is based on the difference between the first number of accesses of the first data within the first time period and the second number of accesses of the second data within the first time period.

13. The IHS of claim 12, wherein the relationship is based on a variance of the expected different value being below an expected difference value variance threshold.

14. A method for performing data-relationship-based cache operations, comprising:
identifying, by a storage controller device, a relationship between first data that is stored in at least one first storage device and second data that is stored in the at least one first storage device, wherein the relationship is based on a difference between a first number of accesses of the first data associated with a first time period and a second number of accesses of the second data associated with the first time period being within an access difference threshold range;
determining, by the storage controller device subsequent to identifying the relationship, that the first data has been accessed in the at least one first storage device a number of times within a second time period that exceeds a cache threshold; and
moving, by the storage controller device in response to determining that the first data has been accessed the number of times within the second time period that exceeds the cache threshold and based on the relationship identified between the first data and the second data, both the first data and the second data to at least one second storage device.

15. The method of claim 14, wherein the at least one first storage device is a Hard Disk Drive (HDD) storage device, and wherein the at least one second storage device is a Solid-State Drive (SSD) storage device.

16. The method of claim 14, wherein the first data is provided by a first data chunk, and wherein the second data is provided by at least one second data chunk.

17. The method of claim 14, wherein the relationship is based on a variance of the difference between the first number of accesses of the first data associated with the first time period and the second number of accesses of the second data associated with the first time period being above a difference variance threshold.

18. The method of claim 14, further comprising:
receiving, by the storage controller device prior to identifying the relationship between the first data and the second data, a first access request identifying the first data and, in response, retrieving the first data from the at least one first storage device; and
receiving, by the storage controller device subsequent to identifying the relationship between the first data and the second data and moving both the first data and the second data to the at least one second storage device, a second access request identifying the first data and, in response, retrieving the first data from the at least one second storage device.

19. The method of claim 14, wherein the difference between the first number of accesses of the first data associated with the first time period and the second number of accesses of the second data associated with the first time period is provided by an expected difference value at a point in time that is based on the difference between the first number of accesses of the first data within the first time period and the second number of accesses of the second data within the first time period.

20. The method of claim 19, wherein the relationship is based on a variance of the expected different value being below an expected difference value variance threshold.

* * * * *